US012626934B2

(12) United States Patent
Hausmann et al.

(10) Patent No.: US 12,626,934 B2
(45) Date of Patent: May 12, 2026

(54) AIR SUPPLY APPARATUS FOR FUEL CELL SYSTEMS, AND FUEL CELL SYSTEM

(71) Applicant: CELLCENTRIC GMBH & CO. KG, Kirchheim unter Teck (DE)

(72) Inventors: Philipp Hausmann, Kirchheim (DE); Oliver Harr, Reichenbach (DE); Benjamin Pieck, Kirchheim (DE)

(73) Assignee: CELLCENTRIC GMBH & CO. KG, Kirchheim unter Teck (DE)

( * ) Notice: Subject to any disclaimer, the term of this patent is extended or adjusted under 35 U.S.C. 154(b) by 574 days.

(21) Appl. No.: 17/998,778

(22) PCT Filed: May 12, 2021

(86) PCT No.: PCT/EP2021/062565
§ 371 (c)(1),
(2) Date: Nov. 14, 2022

(87) PCT Pub. No.: WO2021/228908
PCT Pub. Date: Nov. 18, 2021

(65) Prior Publication Data
US 2023/0178764 A1 Jun. 8, 2023

(30) Foreign Application Priority Data

May 15, 2020 (DE) ..................... 10 2020 206 162.9

(51) Int. Cl.
*H01M 8/04089* (2016.01)
*H01M 8/04111* (2016.01)
(Continued)

(52) U.S. Cl.
CPC .... *H01M 8/04111* (2013.01); *H01M 8/04097* (2013.01); *H01M 8/04761* (2013.01); *F04D 13/06* (2013.01)

(58) Field of Classification Search
CPC ......... H01M 8/04111; H01M 8/04097; H01M 8/04761; H01M 8/04089; F04D 13/06; Y02E 60/50
(Continued)

(56) References Cited

U.S. PATENT DOCUMENTS

| | | | | |
|---|---|---|---|---|
| 5,662,184 | A | * 9/1997 | Riemer | .................. H01M 8/04 |
| | | | | 180/65.1 |
| 2004/0151964 | A1* | 8/2004 | Finger | ................ H01M 8/04111 |
| | | | | 429/513 |

(Continued)

FOREIGN PATENT DOCUMENTS

| | | |
|---|---|---|
| DE | 10120947 | 10/2002 |
| DE | 10312647 | 9/2004 |

(Continued)

OTHER PUBLICATIONS

International Search Report and Written Opinion for International (PCT) Patent Application No. PCT/EP2021/062565, dated Aug. 12, 2021, 8 pages.

(Continued)

*Primary Examiner* — Christian Roldan
(74) *Attorney, Agent, or Firm* — Sheridan Ross P.C.

(57) ABSTRACT

The invention relates to an air supply device for fuel cell systems with a flow compressor and an electric drive motor for the flow compressor, wherein the flow compressor has two compressor wheels which are essentially symmetrical and which are arranged, together with the electric drive motor there between, on a common shaft. The air supply device according to the invention is characterized in that the two compressor wheels are connected on the pressure side to two systems which are pneumatically not permanently connected. A fuel cell system which uses such an air supply device is also claimed.

1 Claim, 3 Drawing Sheets

Figure 1:
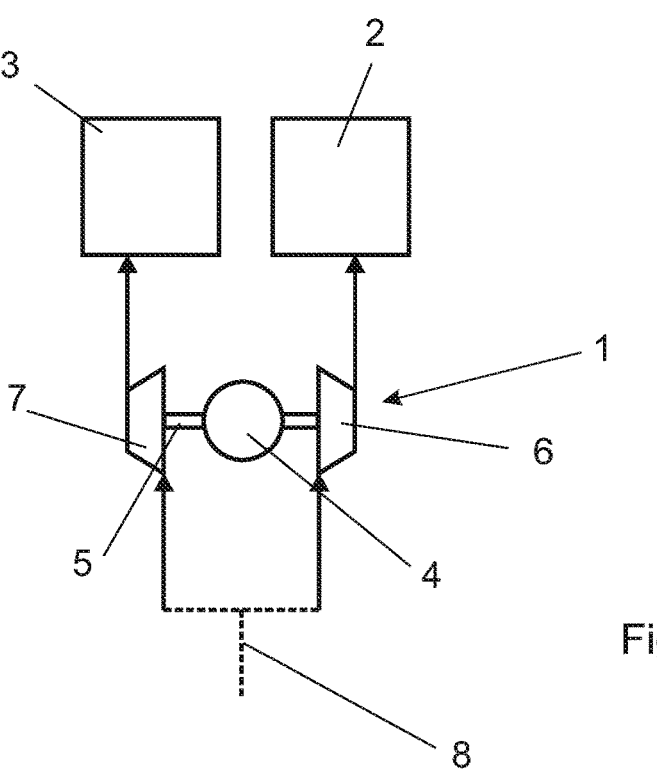

(51) Int. Cl.
    *H01M 8/04746*        (2016.01)
    *F04D 13/06*          (2006.01)
(58) Field of Classification Search
    USPC ......................................................... 429/415
    See application file for complete search history.

(56)                    References Cited

U.S. PATENT DOCUMENTS

| | | | |
|---|---|---|---|
| 2005/0003258 A1* | 1/2005 | Sang | H01M 8/04111 |
| | | | 429/513 |
| 2009/0208798 A1* | 8/2009 | Kim | H01M 8/04126 |
| | | | 429/413 |
| 2010/0062301 A1 | 3/2010 | Hndriks | |
| 2012/0051952 A1* | 3/2012 | Knoop | F04D 29/057 |
| | | | 417/423.12 |
| 2019/0074527 A1* | 3/2019 | Suzuki | F04D 25/045 |
| 2021/0372412 A1* | 12/2021 | Kemmer | F04D 17/12 |

FOREIGN PATENT DOCUMENTS

| | | |
|---|---|---|
| DE | 102010035725 | 3/2012 |
| DE | 102017220855 | 5/2019 |
| DE | 102021000329 | 3/2021 |
| WO | WO 02/086997 | 10/2002 |
| WO | WO 2019/096890 | 5/2019 |

OTHER PUBLICATIONS

English Translation of the International Search Report for International (PCT) Patent Application No. PCT/EP2021/062565, dated Aug. 12, 2021, 2 pages.

\* cited by examiner

AIR SUPPLY APPARATUS FOR FUEL CELL SYSTEMS, AND FUEL CELL SYSTEM

CROSS REFERENCE TO RELATED APPLICATIONS

This application is a national stage application under 35 U.S.C. 371 and claims the benefit of PCT Application No. PCT/EP2021/062565 having an international filing date of 12 May 2021, which designated the United States, and which PCT application claimed the benefit of German Patent Application No. 10 2020 206 162.9 filed 15 May 2020, the contents of each of which are incorporated herein by reference in their entireties.

The invention relates to an air supply device for fuel cell systems according to the preamble of claim 1 and a fuel cell system which is supplied via this device.

Fuel cell systems are known from the prior art. For their air supply, flow compressors are often used, some of which are electrically driven. It is very often the case that a turbine is arranged on one side of an electric motor and a compressor is arranged on the other side. This design, which is also known as an electric turbocharger or motor-assisted turbocharger, is often used because it is able to recover residual energy from the exhaust gases. However, it has the disadvantage that the bearings are loaded unevenly, since the forces acting in the region of the compressor and the forces acting in the region of the turbine sometimes differ greatly. This leads to increased friction in the region of the axial bearing. This means that very complex and expensive axial bearings are required, in the region of which undesirably high performance losses can hardly be avoided.

Other structures can also be designed as two-stage compressors with an electric motor and two compressor wheels on the same shaft. DE 10 2010 035 725 A1 can be referred to as an example in this context. Here, too, the load on the axial bearing is relatively high, since there are different pressure conditions and forces on the different sides. In the document mentioned, an attempt is made to compensate for this via the wheel back parts of the compressor wheels.

The generic WO 2019/096890 A2 solves this force imbalance by arranging two symmetrical compressor wheels on a common shaft with the electric drive motor. This allows the axial forces to be significantly reduced. Smaller axial bearings and much less friction in the region of these axial bearings are thus possible.

Regarding further prior art, reference can also be made to the applicant's DE 101 20 947 A1, which describes the combination of an electrically driven flow compressor with a so-called freewheel, i.e. a freewheeling turbocharger with a turbine on one side and a compressor on the other side.

The object of the present invention is now to specify an improved air supply device for fuel cell systems according to the preamble of claim 1 and, moreover, an improved fuel cell system using this air supply device.

According to the invention, this object is achieved by an air supply device for fuel cell systems having the features of the claims. Advantageous refinements and developments of the air supply device result from the dependent claims. Advantageous refinements and developments of the fuel cell system result from the dependent claims.

The air supply device for fuel cell systems provides, in a comparable way to the generic prior art, for a flow compressor which is driven by an electric drive motor. In this case, the flow compressor has two compressor wheels which are of essentially symmetrical design and are arranged on a common shaft together with the electric drive motor arranged there between. According to the invention, the two compressor wheels are connected to two systems that are not permanently connected pneumatically.

This use of an electrically driven flow compressor with two substantially symmetrical compressor wheels in the manner described in the generic prior art enables the axial bearings to be significantly relieved, which simplifies their construction and reduces friction. In case of fuel cell applications in the automotive sector and power levels usually involved, up to 2 kW of power loss can be saved. The use of the generated air currents, in which the compressor wheels are connected to two different systems on the pressure side, which are not or at least not permanently connected pneumatically, has the decisive advantage that only part of the heat is introduced into both systems, while in case of merged pressure-side air conduits, this heat is jointly present in the components, which can very quickly lead to a thermal overload of the components in fuel cell systems.

The air supply according to the invention can now be used in particular to supply air via the one common air supply device to two fuel cell systems that are separate from one another, as provided according to a very advantageous development of the air supply device. The separate fuel cell systems can be, for example, two systems of the same type that are combined with one another within a modular structure, for example in order to provide the drive power required for a commercial vehicle. It would just as well be conceivable to jointly supply a fuel cell system and another air-supplied system of any other kind.

According to a particularly advantageous development of the air supply device according to the invention, the two systems that are not pneumatically permanently connected to one another are a compressor side and a turbine side of a free-running turbocharger. The air supply device with the two symmetrical compressor wheels thus supplies the compressor side of a freewheel via one compressor wheel, while the turbine is supplied with a flow via the other compressor wheel. This essentially results in register charging, in which the electrically driven flow compressor provides a pressure level of 1.5 to 2.5 bar, for example. This pressure then goes from the compressor wheel into the compressor side of the freewheel, which increases the pressure further, for example up to 4.5 bar, for supplying a fuel cell system. The volumetric flow of the other compressor wheel reaches the turbine side of the freewheel and thus provides the energy required to drive the compressor side and to increase the pressure. This construction is extremely simple and advantageous. In particular, the freewheel in a fuel cell system can be designed in such a way that it can freeze over, in the event that it is possibly supplied with very moist gases. However, in this case, the air can be blown through the compressor side of the freewheel to the fuel cell system via the one electrically driven compressor wheel, which is at least sufficient to start and then thaw it.

According to a further very advantageous embodiment, the systems that are not pneumatically permanently connected to one another can now be connected in a controllable manner via a bypass line provided with a valve. Such a controllable connection of the two systems that are otherwise not permanently connected makes it possible, for example, to provide a large volumetric flow at low pressure, in particular for the configuration with the additional freewheel according to the embodiment variant described above. In particular, for this design, a relatively high pressure with a correspondingly lower volumetric flow can then be provided with a closed bypass line and thus a correspondingly high drive power on the turbine side of the freewheel. If the valve in the bypass line is gradually opened, more air gets to the compressor side and less to the turbine side. This enables a higher volumetric flow at a lower pressure.

A heating occurs in the compressor or in both compressor stages of the variant with the freewheel. On the one hand, this is undesirable because it puts a corresponding load on the fuel cell systems. On the other hand, it is desirable to keep the supply air to the fuel cell systems moist in order to prevent it from drying out. For this reason, according to an advantageous embodiment of the invention, provision can be made for a device for supplying liquid to the compressed air flow upstream and/or downstream of the compressor side in the direction of flow This introduction of liquid, in particular deionized water, which according to an advantageous embodiment of this invention can take place via a nozzle for atomizing the liquid, on the one hand reduces the temperature of the compressed air flow, since the liquid in it evaporates accordingly, and on the other hand humidifies the same. This provides two crucial advantages. On the one hand, it improves the efficiency of the compressor side if the liquid is supplied upstream of the compressor side, and on the other hand it ensures—in both configurations—that the supply air to the fuel cell is humidified. Elaborate, complicated and bulky devices within the fuel cell system devices for humidifying the supply air can thus be replaced by a simple water reservoir, which can also collect and recycle condensate, if needed, and a corresponding device for feeding the water into the compressed air flow. Such structures can be integrated into the air supply device in a very simple, cost-effective and space-saving manner.

A very advantageous development of the air supply device according to the invention can also provide that the free-running turbocharger is hydro-dynamically journaled. Such a hydrodynamic bearing can be extremely simple and efficient and can reduce the friction created by the high-speed turbocharger. It is particularly favorable if water, for example the water which, in the previously described embodiment, is carried along anyway for humidifying the system or which is recovered from the system, is used to implement the hydrodynamic bearing of the free-running turbocharger.

The free-running turbocharger is particularly well suited to implement this hydrodynamic bearing. Even if there is a leak between the bearings and the exhaust air or also the compressed air, this is relatively uncritical since this air, in the case of the exhaust air, is not reused, so that moisture is not disruptive in this case, and the supply air is then moistened anyway, so that the moisture here is not disruptive either, but rather beneficial. This is a crucial difference with respect to an electrically driven compressor, for example, which could get wet in the region of the electrical or electronic system in case of a leak of a water-fed hydrodynamic bearing, which can lead to a potential risk of massive short circuits and represents a serious disadvantage.

According to the invention, in a fuel cell system with at least one fuel cell it can be provided that the fuel cell is supplied with at least part of the air from an air supply device according to the invention. A fuel cell system can therefore use the air supply device alone or together with another fuel cell system or other system in order to obtain its compressed and ideally already humidified supply air.

A particularly advantageous development of such a fuel cell system with at least one fuel cell, which has an anode side and a cathode side, and with an air supply device with a freewheel, can also provide that the output of the cathode side can be connected in a controlled way selectively or proportionally with the environment and/or a recirculation line, wherein the recirculation line opens out between one of the compressor wheels and the compressor side of the free-running turbocharger. In this refinement of a fuel cell system, the free-running turbocharger is therefore used for recirculating cathode exhaust gas, which is completely or in particular partially recirculated through the compressor side of the free-running device. As a result, moisture, which is carried by the cathode exhaust gas as a product of the reaction in the fuel cell, is also introduced into the compressed supply air. This makes it possible to dispense with a complex humidifier and the possibility of reducing or even dispensing with injecting liquid into the compressed air flow. It is also provided that the recirculation rate of the oxygen-depleted exhaust air from the cathode side can be used, for example at low loads, to lower the oxygen content in the cathode. This prevents excessive cell voltages and thus damage to the individual cells of the fuel cell.

A further very favorable embodiment of the fuel cell system can additionally or alternatively provide for a recirculation of anode exhaust gas, which takes place at least partially via a recirculation fan. This is known in principle from the prior art. The variant of the fuel cell system according to the invention in this design also provides that the recirculation fan has an exhaust air turbine, which is driven by the exhaust gas of the fuel cell system, in particular the cathode exhaust air. Such an exhaust air turbine, which according to a very advantageous development of this invention is magnetically coupled to the recirculation fan, thus uses the residual energy in the exhaust gases of the fuel cell in order to drive the recirculation fan. The introduced pneumatic energy can thus be ideally used. Particularly in the case of the design with a magnetic coupling between the exhaust air turbine and the recirculation fan, the hydrogen-carrying side of the construction remains separated from the air-carrying side to such an extent that they can be reliably sealed from one another and there is no risk of uncontrolled hydrogen leaks into the exhaust air.

Advantageous refinements and developments of the air supply device according to the invention and of the fuel cell system according to the invention also result from the exemplary embodiments, which are described in more detail below with reference to figures.

Figure 2:
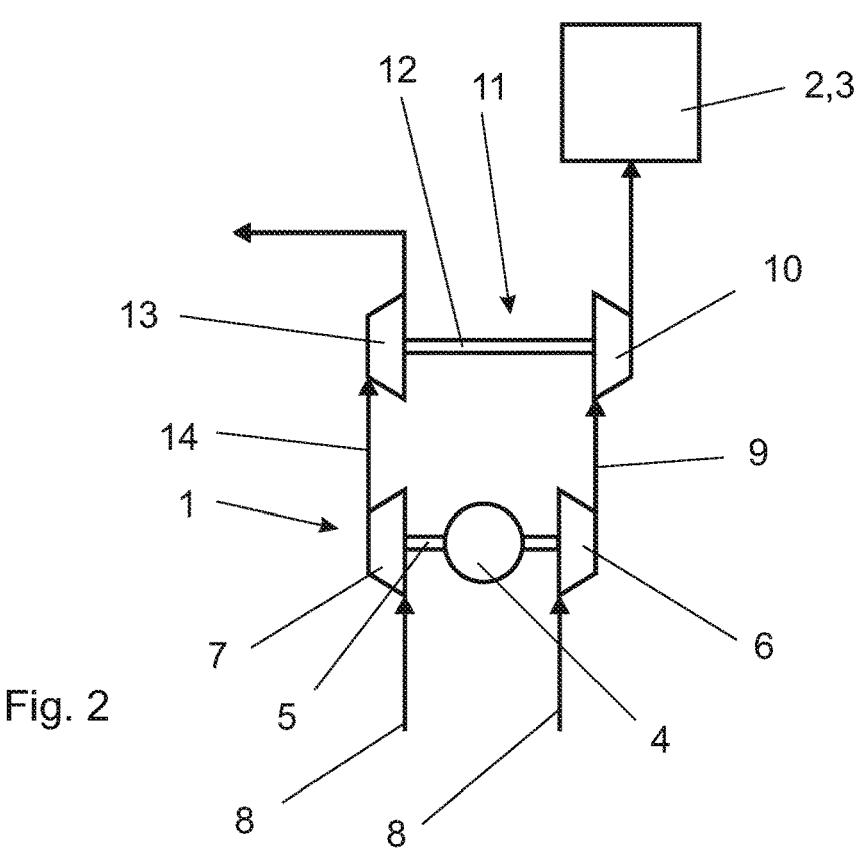
Figures 3, 4:
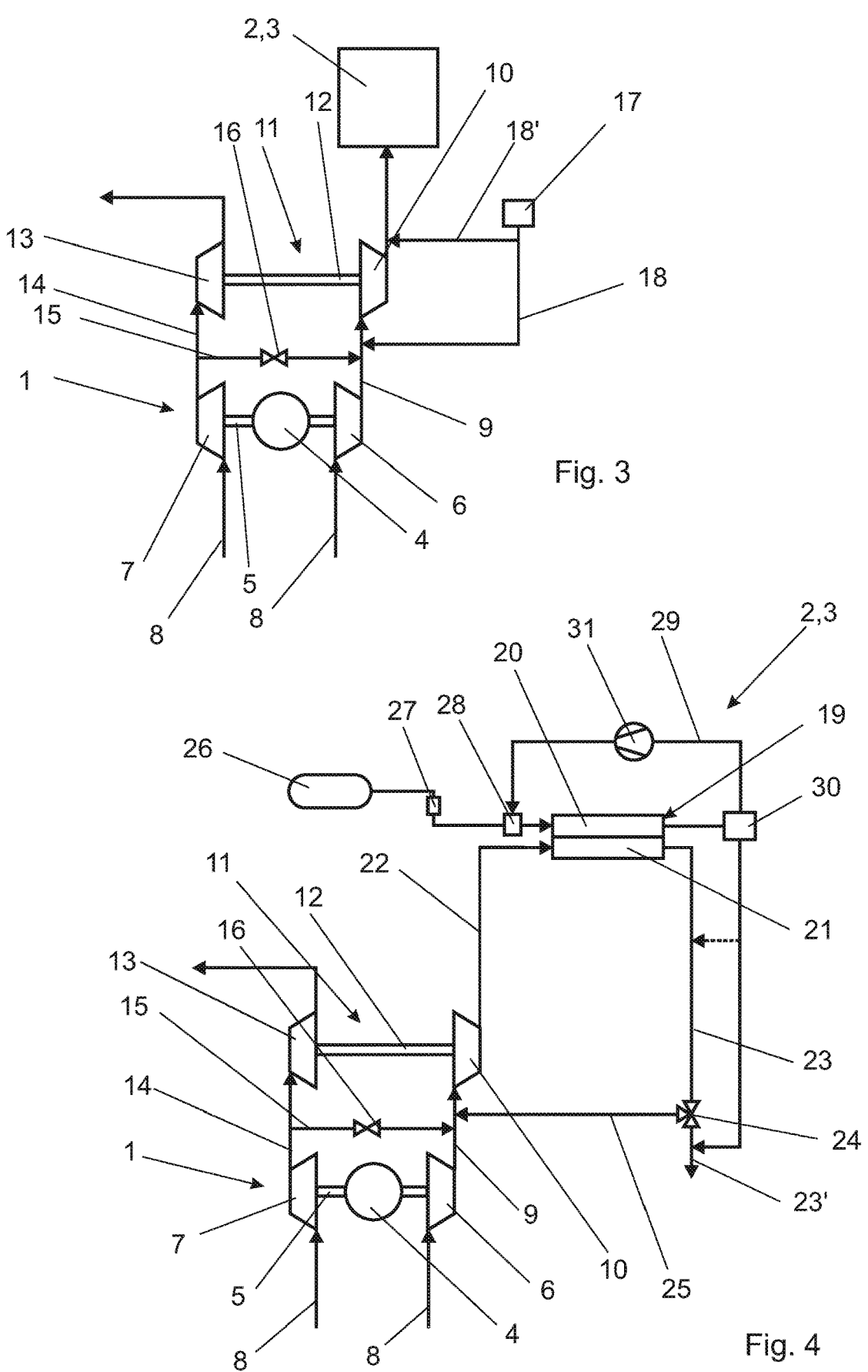
Figures 5, 6:
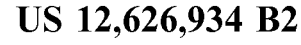

In the figures:

FIG. 1 an air supply device according to the invention in a first possible embodiment;

FIG. 2 an air supply device according to the invention in a second possible embodiment;

FIG. 3 the air supply device according to the invention as shown in FIG. 2 in an alternative configuration;

FIG. 4 a possible embodiment of a fuel cell system with the air supply device according to FIG. 2 or 3;

FIG. 5 a fuel cell system analogous to that in FIG. 4 in an alternative development; and FIG. 6 a detail from the representation according to FIG. 5 with an exemplary system for the use of water in the fuel cell system.

In the representation of FIG. 1, an air supply device 1 for fuel cell systems 2, 3 is shown. The air supply device consists essentially of an electric drive motor 4, which is arranged on a common shaft 5 with two compressor wheels 6, 7. The compressor wheels 6, 7 are driven by the electric drive motor 4 arranged centrally there between on the shaft 5 and are designed essentially symmetrically. As a result, forces acting on the common shaft 5 in the axial direction are minimized. On the one hand, this helps to reduce friction losses and, on the other hand, allows axial bearings to be designed in a simple and efficient manner. Air is drawn in by the compressor wheels 6, 7 via two separate intake paths or optionally via a common intake path 8, as shown in broken lines, and provided to the fuel cell system 2 by the compressor wheel 6 and to the fuel cell system 3 by the compressor wheel 7.

The fuel cell systems 2, 3 are designed independently of one another and can, for example, be identically designed fuel cell systems 2, 3, which are used to provide drive power in a commercial vehicle. They can be designed, for example, in the way a fuel cell system would be designed for driving a passenger car, so that this fuel cell system is doubled for a commercial vehicle and is supplied with air via one and the same air supply device 1. As already mentioned, a common intake line 8 can be provided, in which a common air filter (not shown here) is then sufficient. It would just as well be conceivable to provide two separate air filters and intake lines 8.

An alternative configuration of the air supply device 1 can be seen in the illustration of FIG. 2. The air supply device 1 is constructed essentially as described in connection with FIG. 1. It includes the electric drive motor 4 and the two compressor wheels 6, 7. These are connected to the environment via two separate air supply lines 8 and draw in air accordingly. Air is compressed in both compressor wheels 6, 7 driven by the electric drive motor 4. From the compressor wheel 6, the compressed air reaches a compressor side 10 of a free-running turbocharger, which is also referred to as a freewheel 11, via a register line 9. In this freewheel 11, a common shaft 12 connects the compressor side 10 to a turbine side 13, which is connected to the pressure side of the compressor wheel 7 of the air supply device 1 and is accordingly driven by this compressor wheel 7 via the air flow. Downstream of the turbine side 13 or its turbine, the expanded air, which had previously reached the turbine side 13 of the freewheel 11 via a turbine line 14 from the compressor wheel 7, flows out again. From the compressor side 10 of the freewheel 11, the supply air, which is now even more compressed, reaches a fuel cell system 2, 3, as is indicated schematically in the illustration in FIG. 2. This design makes it possible for a freewheel 11 to be used in order to generate the pressure required for the fuel cell system 2, 3 on the compressor side 10 of the freewheel 11, based on the pressure that the compressor wheel 6 generates as the first compressor stage. It is therefore a kind of register charging.

A further variant is shown in the illustration in FIG. 3, which is to be understood as essentially analogous to the illustration in FIG. 2. In addition, a bypass line 15 with a valve 16 is provided, which makes it possible to supply a portion of the air, which has been compressed via the compressor wheel 7 of the air supply device 1, from the turbine line 14 into the register line 9. As a result, a higher volumetric flow of air to the fuel cell system 2, 3 can be realized, for example, when the valve 16 is fully or partially open. At the same time, the air flow through the turbine side 13 of the freewheel 11 is correspondingly reduced, so that although there is a higher volumetric flow, the pressure in the fuel cell system 2, 3 is lower. With increasing closing of the valve 16 in the bypass line 15, the power on the turbine side 13 and thus also the compressor power on the compressor side 10 of the freewheel 11 increases accordingly, while at the same time the volumetric flow decreases. This allows a higher pressure to be achieved with a lower volumetric flow. The air supply can therefore be controlled via the valve 16 in the bypass line 15. Even if the bypass line 15 with the valve 16 offers particular advantages, it is to be understood here as purely optional and can in principle also be omitted, as has already been explained in the illustration in FIG. 2.

A water reservoir 17 is now also shown independently of this bypass line 15, so that it can also be used in the design according to FIG. 2, which reservoir is connected via one or optionally two water lines 18, 18', to the compressed supply air flowing to the fuel cell system 2, 3. Via a suitable device for supplying liquid water at the end of the water line 18 and/or 18', liquid water can thus be introduced into the compressed volumetric flow, preferably by atomizing it. The correspondingly hot volumetric flow of compressed air present downstream of the compressor wheel 6 or the compressor side 10 is thereby cooled and humidified. Both functions are advantageous for the operation of the fuel cell system 2, 3 since the supply air should flow to the fuel cell system 2, 3 at a temperature of essentially no more than approx. 70° C. and since air should be humidified as much as possible. If this humidification is achieved by supplying water at this point, an expensive humidifier, for example a gas/gas-humidifier, as has been customary up to now, can be dispensed with or at least its size can be reduced. This eliminates a large and complex component, which is a very decisive advantage in terms of costs, system complexity and space requirements. A further use of the water collected in the water reservoir 17 also results from the representation in FIG. 6, which will be described later.

In the illustration of FIG. 4, the fuel cell system 2, 3 is now shown in more detail with some of its components as an example. The design of the air supply device 1 and of the freewheel 11 essentially corresponds to that from FIG. 3. The fuel cell system 2, 3 comprises a fuel cell 19, which is typically a stack of individual cells. An anode side 20 and a cathode side 21 are shown as an example around this fuel cell stack 19. The cathode side 21 is now supplied with air via an air supply line 22 via the air supply device 1 and the freewheel 11. Exhaust air reaches, via an exhaust air line 23, a valve device denoted by 24, wherein this valve device can also be denoted as an exhaust gas recirculation valve 24. Optionally or partially, the exhaust air from the exhaust air line 23 can be completely or partially returned via an exhaust air return line 25 to the register line 9 via this valve device 24, or to the environment via the portion of the exhaust air line 23 indicated by 23'.

The anode side 20 is supplied with hydrogen from a compressed gas storage 26. This hydrogen reaches the anode side 20 via a pressure control and metering device 27 and an optional gas jet pump 28. Exhaust gas from the anode side 20 returns to the gas jet pump 28, if provided, via a recirculation line 29, in which a water separator 30 can be arranged. A recirculation fan 31 can be arranged in the recirculation line 29 in a manner known per se, as an alternative or in addition to the gas jet pump 28. A so-called blow-off or purge valve is arranged in the water separator 30 or alternatively in another region of the recirculation line 29, via which valve, depending on the time, depending on the hydrogen concentration in the recirculation line 29 or also depending on other parameters, for example, gas from the recirculation line 29, is drained, optionally together with water from the water separator 30. This gas enters the exhaust air line 23, and here optionally either in the region 23' of the exhaust air line or, as is optionally indicated, also in the region of the exhaust air line 23 in the direction of flow of the exhaust air upstream of the exhaust gas recirculation valve 24.

In this design of the fuel cell system 2, 3, it is now possible to completely or partially return exhaust air via the exhaust air return line 25 with a corresponding position of the valve device 24, so that the humidification of the supply air in the supply air line 22 to the cathode side 21 of the fuel cell 19 is supported. As an alternative or in particular in addition to the use of the water reservoir 17, as indicated in the illustration in FIG. 3, this can contribute to the fact that a conventional humidifier can be completely or partially dispensed with. Admittedly, there is now a risk of moisture getting into the region of the freewheel 11. If the system is at a standstill at temperatures below freezing point, this can lead to the freewheel 11 freezing up. In contrast to the freezing of the air supply device 1, this eventuality is relatively uncritical, since for the start of the fuel cell system 2, 3 the air conveyed via the compressor wheel 6 and, if necessary, when the bypass valve 16 is open, via the compressor wheel 7, and blown, through the compressor side 10 of the freewheel, into the supply air line 22, is by far sufficient. It is therefore sufficient if the freewheel 11 then resumes its operation when it has thawed out sufficiently. The design with the combination of air supply device 1 and freewheel 11 thus enables not only optimal operation with a high degree of controllability of pressure and volumetric flow of the supplied air, but also makes it possible to dispense with a humidifier, since exhaust gas recirculation is possible without the risk of the entire air supply device 1 freezing in case of temperatures below freezing point.

In contrast to conventional electric turbochargers, in which the pressure energy in the fuel cell system 2, 3 is relieved and is also used to support the drive of the air supply device 1, for example, this pressure is now lost in the design according to FIG. 4. In order to prevent precisely this, it is possible to further develop the design as shown in FIG. 5. This design essentially corresponds to that in FIG. 4, wherein the water separator 30 and the discharge of anode exhaust gas has been omitted in the illustration for the sake of simplicity. The gas jet pump 28, which was only optional anyway, is no longer present in the illustration in FIG. 5. Instead of an electric drive for the recirculation fan 31, as is typically provided, it is now provided that the exhaust air flows out of the cathode side 21 of the fuel cell 19 via an exhaust air turbine 32 which is arranged in the exhaust air line 23 and is coupled to the recirculation fan 31 in a power-transmitting manner, which is indicated here in the form of a common shaft 33. This makes it possible to use the energy contained in the exhaust air from the cathode side 21 of the fuel cell 19 to drive the recirculation fan 31 in order to recover this energy and thus make the overall system even more energy-efficient. It is particularly advantageous if the coupling between the exhaust air turbine 32 and the recirculation fan 31 takes place magnetically. As a result, the two volumes, which carry hydrogen or hydrogen-containing gas on the one hand and air on the other, can easily be hermetically sealed from one another.

All described embodiment variants can of course be combined with one another, so that the bypass line 15 can also be dispensed with in the embodiment variants of FIGS. 3, 4 and 5 or, correspondingly, in the embodiment variants of FIGS. 2, 4 and 5, the water reservoir 17 with the water lines 18, 18' can additionally be provided. The design shown in the representations of FIG. 2 *ff*., is particularly suitable for supplying air to a single fuel cell system 2, 3. If a plurality of fuel cell systems are used, the design from FIG. 1 would be more suitable or the design shown in FIG. 2 *ff*. would have to be present multiple times, as would the fuel cell systems 2, 3 themselves.

The water reservoir 17 already mentioned can be filled with water, for example, which is recovered from the system. The fuel cell system 2, 3 typically has a water separator, for example in the recirculation line 29, as can be seen in the illustration in FIG. 4, and can also be provided with a further water separator in the region of the exhaust air line 23, if required. As already mentioned, the water from this water separator can feed the water reservoir 17. According to an advantageous embodiment, this can now be designed in the form of an insulated water tank 170 or—as shown—be connected to such a tank. This is drawn in with a dashed line in the illustration in FIG. 6. The entire water system connected to this water tank 170 is shown in dashed lines. The water in the water tank 170 is heated. This can be done, for example, via electrical heating, or waste heat from the fuel cell system 2, 3 can be used for heating in addition or as an alternative. In particular, waste heat that is present in the exhaust air from the turbine 13 of the free-running turbocharger can be used to heat the water tank 170 accordingly. The water stored in it ideally has a temperature of approx. 80° C., the water tank 170 has thermal insulation 171. The water from the water tank 170 is then conducted via a water pump 172 into a pressurized water distributor 173, for example in the form of a so-called common rail. The individual water lines then branch off from this system, which is under the corresponding pressure, wherein the water lines 18 and 18', which are already known from FIG. 3, lead to humidifiers 34, 35, in which, for example, through a single-component or two-component nozzle, the volumetric flow in the register line 9 and/or in the supply air line 22 can be humidified accordingly. These humidifiers 34, 35 can be operated electrically.

Two further water lines 174 and 175 are used to supply water to two hydrodynamic bearings 36, 37 of the free-running turbocharger, so that the latter is virtually water-bearing. In the fuel cell system 2, 3, sufficient waste water is typically produced to accomplish both the humidification of the supply air flow and the bearing of the free-running turbocharger, so that the water can be supplied to the system without an external supply of water. The design allows the use of components for the water tank 170, the water pump 172 and the humidifiers 34, 35, which are already known from the field of conventional vehicles, and here in particular from the field of internal combustion engine technology, and which are normally used, in particular to minimize emissions and fuel consumption in internal combustion engines with fuel injection. Such components are therefore available on the market in a simple, well-tested and cost-effective form.

The invention claimed is:

1. An air supply device for fuel cell systems having a flow compressor and an electric drive motor for the flow compressor, wherein the flow compressor has two compressor wheels which are essentially symmetrical and which are arranged, together with the electric drive motor arranged there between, on a common shaft, characterized in that the two compressor wheels are connected on the pressure side to two systems that are pneumatically not permanently connected, wherein the two systems that are pneumatically not permanently connected systems are two fuel cell systems, and the two compressor wheels are configured to supply air to the two fuel cell systems, wherein the pneumatically not permanently connected systems are controllably connected via a bypass line provided with a valve, and wherein a device for supplying liquid into compressed air flow from the flow compressor is provided, which in particular has at least one nozzle for atomizing the liquid in the compressed air flow.

* * * * *